Aug. 1, 1933.  W. E. KIDDER  1,920,866
SLED
Filed June 23, 1930   3 Sheets-Sheet 2
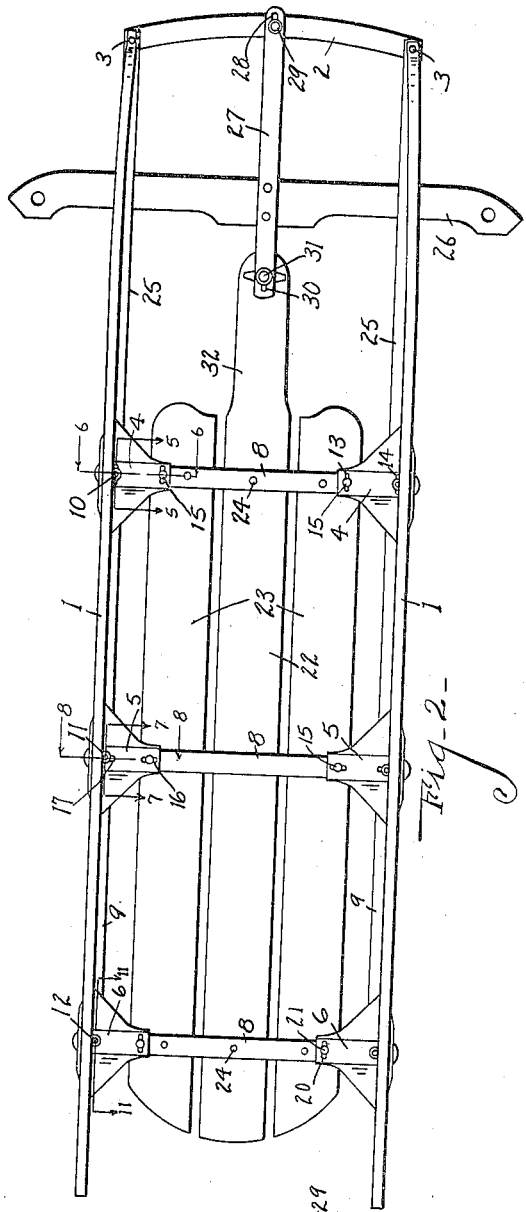
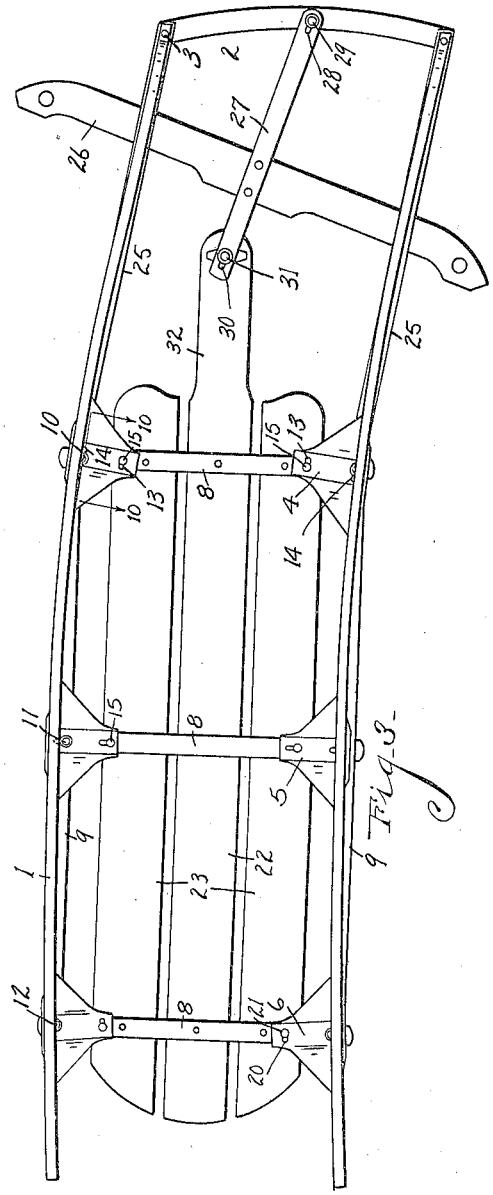
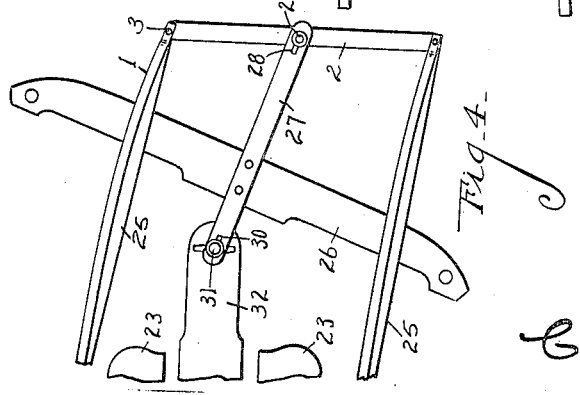
INVENTOR
*William E. Kidder*
BY
*Chappell & Earl*
ATTORNEYS Aug. 1, 1933.　　　　　W. E. KIDDER　　　　　1,920,866
SLED
Filed June 23, 1930　　　3 Sheets-Sheet 3
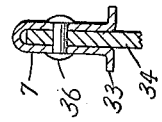
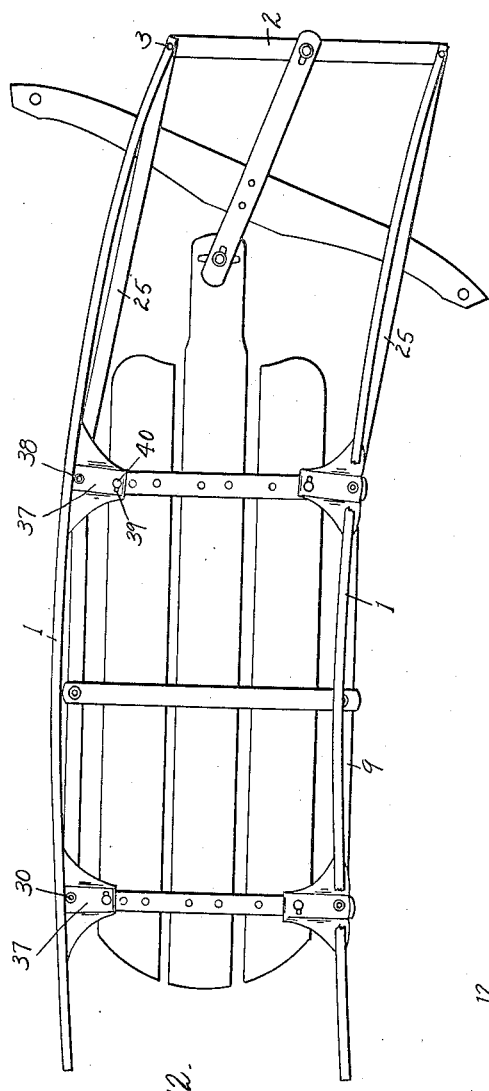
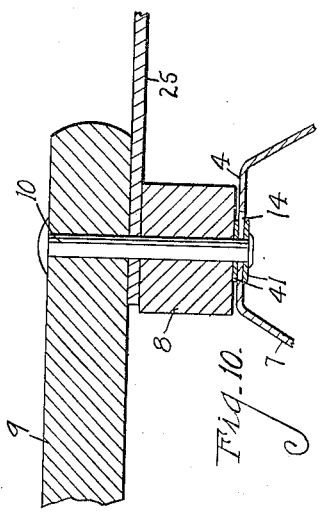
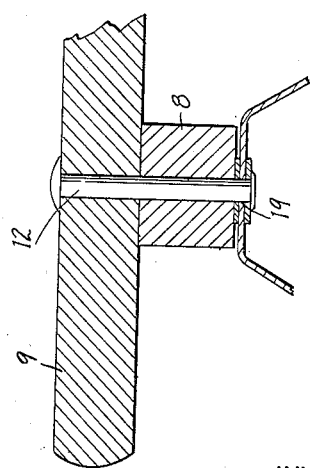
INVENTOR
William E. Kidder
BY
Chappell & Earl
ATTORNEYS Patented Aug. 1, 1933

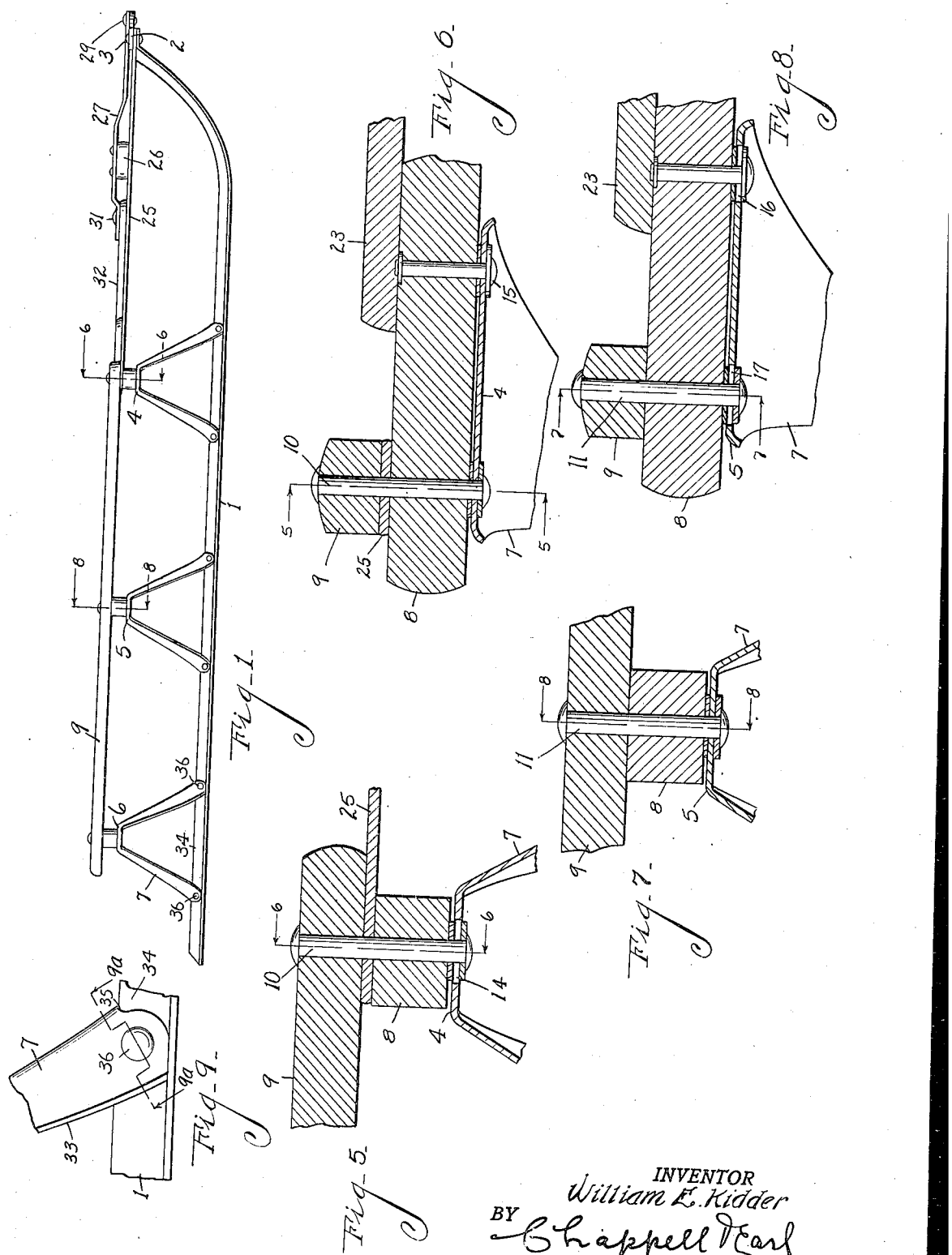

1,920,866

UNITED STATES PATENT OFFICE 1,920,866

SLED

William E. Kidder, Kalamazoo, Mich., assignor to Kalamazoo Sled Company, Kalamazoo, Mich.

Application June 23, 1930. Serial No. 462,999

5 Claims. (Cl. 280—22)

The main objects of this invention are:

First, to provide a hand sled of the so-called steering type in which a portion of the runners carrying the load may be easily deflected or curved thereby resulting in a positive steering of the sled on ice or other hard surface.

Second, to provide in a steering sled an improved arrangement of parts which results in a very positive control of the sled, enabling the turning thereof in a relatively short distance.

Third, to provide a sled having these advantages which may be manipulated with a minimum of effort on the part of the user and with a minimum of strain on the parts.

Fourth, to provide in a sled having these advantages a knee construction which is well adapted to withstand the steering strains and at the same time is comparatively light and rigid.

Objects relating to details and economies of my invention will appear from the description to follow. The invention is defined and pointed out in the claims.

A structure which is a preferred embodiment of my invention is illustrated in the accompanying drawings, in which:

Fig. 1 is a side elevation of my improved sled.

Fig. 2 is an inverted view with the runners in straight or normal position.

Fig. 3 is an inverted view with the runners deflected.

Fig. 4 is an inverted fragmentary view with the runners deflected to their extreme position.

Fig. 5 is an enlarged fragmentary view mainly in section on line 5—5 of Figs. 2 and 6 showing structural details.

Fig. 6 is a fragmentary view mainly in section on line 6—6 of Figs. 1, 2 and 5.

Fig. 7 is a fragmentary view mainly in section on line 7—7 of Figs. 2 and 8.

Fig. 8 is a fragmentary view mainly in section on line 8—8 of Figs. 1, 2 and 7.

Fig. 9 is an enlarged fragmentary side elevation showing structural details of my improved knee.

Fig. 9—A is a fragmentary section on line 9A—9A of Fig. 9.

Fig. 10 is an enlarged fragmentary view mainly in section on line 10—10 of Fig. 3 showing the position of the parts with the runners flexed to the position showing therein.

Fig. 11 is an enlarged fragmentary view mainly in section on line 11—11 of Fig. 2.

Fig. 12 is an inverted view of a modified structure embodying certain features of my invention.

Referring to the drawings, the runners 1 are preferably of T-cross section, their front ends being curved upwardly and connected by the cross bar 2, the cross bar and runners being connected by the pivots 3.

I provide pairs of front, intermediate and rear knees 4, 5 and 6 respectively. These knees comprise downwardly diverging leg portions 7 and inwardly projecting brackets providing seats for the benches 8.

The raves 9 are mounted upon the outer ends of the benches by means of rivets 10, 11 and 12. Though these rivets are similar they are given separate numerals to facilitate pointing out their relation to other parts.

The knees 4 are provided with transverse slots 13 and 14, the slots 14 engaging the rivets 10 thereby providing a pivotal and sliding connection. Headed studs 15 engage the inner slots 13 providing a swinging connection for the inner ends of the knees 4 to the benches.

The brackets or knees 5 are provided with longitudinal slots 16 and 17, the rivets 11 engaging the slots 17 while headed studs 18 on the intermediate bench engage the slots 16.

The rear knees 6 have pivot holes 19 engaged by the rivets 12 and transverse slots 20 in the inner ends of the knee brackets engaged by the headed studs 21 of the rear bench.

With this connection the front knees have a sliding and pivotal connection to the front bench; the intermediate knees have a sliding connection transversely of the sled to the intermediate bench while the rear knees have a pivotal connection to the rear bench.

The top, in the embodiment illustrated, is formed of the center board 22 and the boards 23 disposed at each side thereof. These top boards are fixed to the front and rear benches as by the fastenings indicated at 24. They are not secured or fixed to the intermediate bench and this is quite an important feature in the embodiment of my invention shown in Figs. 1 to 11 inclusive.

Links 25 are engaged with the rivets 10 and 3, these links constituting in effect extensions for the raves although pivotally connected thereto.

The steering bar 26 is rigidly mounted on the steering lever 27 which has a longitudinal slot 28 at its forward end engaging with the centrally disposed pivot 29 on the cross bar 2 and a longitudinal slot 30 in its rear end engaging with a pivot 31 on the forwardly projecting end 32 of the center board 22.

It will be noted that with the parts in normal position as best shown in Fig. 2, the pivot 31 engages or lies at the outer end of the slot 30 while the pivot 29 engages or lies at the inner end of the slot 28 and when the runners are deflected to approximately the limit of their deflection as shown in Fig. 4 the position of the pivots relative to the slots is reversed; that is, the pivot 31 is at the inner end of the slot 30 while the pivot 29 is at the outer end of the slot 28. The purpose of this is to permit greater deflection of the runners and also to render such deflection more easy and less strain on the parts. This is a feature to be desired as it reduces the likelihood of splitting the top board 22.

The knees are formed as sheet metal stampings, the legs being of a channel cross section and provided with marginal flanges 33 which extend to the bottom thereof. The sides of the channel are gradually contracted toward the lower ends of the knees so that at their lower ends they closely embrace the upwardly projecting web 34 of the runners, the legs being notched at 35 to receive this web and being secured thereto by the rivets 36.

The flanges 33, as stated, are continued to the ends of the legs and rest upon the upper sides of the runners as shown in Fig. 9. These flanges 33 serve as reinforcing members for the legs and also bracing members therefor; that is, being in contact with the upper sides of the runners, the flanges sustain a substantial portion of the twisting thrust. This permits the legs being made of relatively light material and at the same time they are capable of withstanding the severe strains to which they are subjected in use.

In Fig. 12, I illustrate my steering lever improvements in a modified form of sled in which the front and rear knees 37 are pivoted at 38 and provided with transverse slots 39 engaging the headed studs 40. The intermediate knees are omitted and the front knees have only the pivotal movement as distinguished from the pivotal and sliding movement of the embodiment of my invention shown in the other Figures. My improved steering lever, however, is advantageous for use in this modified form or adaptation of my improvements.

To reduce friction between the knees and the benches I insert washers 41 between these parts. These washers also reduce the tendency to squeak and creak.

I have illustrated and described my improvements in very practical embodiments thereof. The load carrying portions of the runners are deflected so that the steering is very effective, and further, there are no relatively sharp bends in the runners but the curvature extends throughout the length thereof which renders the steering of the sled much more reliable than is possible in structures not having these features and the sled may be turned in a much shorter radius than would otherwise be possible.

I have not attempted to illustrate or describe other embodiments or adaptations as I believe this disclosure will enable those skilled in the art to embody or adapt my improvements as may be desired.

Having thus described my invention, what I claim as new and desire to secure by Letters Patent, is:

1. In a hand sled, the combination of flexible runners, opposed pairs of front, rear and intermediate knees secured to said runners, the front knees each having longitudinally spaced transverse slots therein, the intermediate knees each having spaced longitudinal slots therein and the rear knees having pivot holes at their outer ends and transverse slots at their inner ends, benches arranged on said knees, raves disposed on the outer ends of said benches, said knees, benches and raves being connected by rivets disposed through the outer slots in said front and intermediate knees and the pivot holes of the rear knees, headed studs disposed through said slots in the inner ends of said knees to engage said benches, a top secured to said benches, a cross bar connecting the front ends of said runners, links pivotally connected to the ends of said cross bar and to the front bench, a steering lever provided with longitudinal slots at its ends, said top and cross bar being provided with pivots engaging said slots, and a steering bar on said steering lever.

2. In a hand sled, the combination with a top and front, rear and intermediate benches, of runners, front, rear and intermediate knees secured to said runners, the front knees each having longitudinally spaced transverse slots therein, the intermediate knees each having longitudinally spaced longitudinal slots therein, and the rear knees having pivot holes at their outer ends and transverse slots at their inner ends, said knees being secured to said benches by fastenings engaging said slots and pivot holes, a cross bar connected to the front ends of said runners, a steering lever provided with longitudinal slots at its ends, said top and cross bar being provided with pivots engaging said slots, and a steering bar on said steering lever.

3. In a hand sled, the combination with runners of T-cross section, of a top, knees having downwardly diverging legs of channel cross section provided with outwardly projecting flanges on their edges extending to the bottoms thereof, the lower ends of the legs being forked to receive the upwardly projecting central web of the runners and provide attaching ears, and rivets arranged through said attaching ears and the upwardly projecting webs of the runners, the lower ends of the flanges being in abutting supporting engagement with the horizontal members of the runners.

4. In a hand sled, the combination with runners of T-cross section, of a top, knees having downwardly diverging legs of channel cross section provided with outwardly projecting flanges on their edges extending to the bottoms thereof, the lower ends of the legs being forked to receive the upwardly projecting central web of the runners and provide attaching ears, and rivets arranged through said attaching ears and the upwardly projecting webs of the runners.

5. In a sled, the combination of runners of inverted T-section, knees having downwardly diverging legs of inverted U-section receiving the vertical runner flange at their lower ends, the web of the leg channel engaging the top of said vertical runner flange and the flanges of the leg channel overlapping said vertical runner flange and engaging the horizontal runner flanges, and means securing said vertical runner flange and leg flanges and together in assembled relation, said leg flanges having marginal out-turned reinforcing flanges extending to the ends thereof and engaging said horizontal runner flanges.

WILLIAM E. KIDDER.